US012315651B2

(12) United States Patent
Rotsch et al.

(10) Patent No.: US 12,315,651 B2
(45) Date of Patent: May 27, 2025

(54) EFFICIENT BREMSSTRAHLUNG CONVERTER

(71) Applicant: UCHICAGO ARGONNE, LLC, Chicago, IL (US)

(72) Inventors: David Rotsch, Montgomery, IL (US); Jerry A. Nolen, Jr., Chicago, IL (US); Jeongseog Song, Lisle, IL (US); Sergey D. Chemerisov, Lisle, IL (US); James L. Bailey, Hinsdale, IL (US); Ronald T. Kmak, Homer Glen, IL (US)

(73) Assignee: UCHICAGO ARGONNE, LLC, Chicago, IL (US)

( * ) Notice: Subject to any disclaimer, the term of this patent is extended or adjusted under 35 U.S.C. 154(b) by 316 days.

(21) Appl. No.: 17/392,803

(22) Filed: Aug. 3, 2021

(65) Prior Publication Data

US 2023/0040941 A1 Feb. 9, 2023

(51) Int. Cl.
*G21G 1/12* (2006.01)
*H05H 6/00* (2006.01)

(52) U.S. Cl.
CPC ................. *G21G 1/12* (2013.01); *H05H 6/00* (2013.01); *H01J 2235/088* (2013.01)

(58) Field of Classification Search
CPC ........ G21G 1/12; H01J 2235/088; G21C 1/12
See application file for complete search history.

(56) References Cited

U.S. PATENT DOCUMENTS

| | | | | |
|---|---|---|---|---|
| 3,999,096 A * | 12/1976 | Funk | H01J 35/116 | 313/352 |
| 5,784,423 A | 7/1998 | Lidsky et al. | | |
| 6,907,106 B1 | 6/2005 | McIntyre et al. | | |
| 10,006,101 B2 | 6/2018 | Stoner et al. | | |
| 2008/0240330 A1* | 10/2008 | Holden | G21G 1/12 | 376/190 |
| 2009/0090875 A1 | 4/2009 | Gelbart et al. | | |
| 2010/0028234 A1* | 2/2010 | Ehst | G21K 5/08 | 422/243 |
| 2014/0192942 A1* | 7/2014 | Tsechanski | G21G 1/12 | 376/190 |

(Continued)

FOREIGN PATENT DOCUMENTS

EP 3000114 B1 5/2018

OTHER PUBLICATIONS

Egorov, Ivan, et al. "Bremsstrahlung converter system with target in vacuum." Vacuum 187 (2021): 110149. (Year: 2021).*

(Continued)

*Primary Examiner* — Sharon M Davis
(74) *Attorney, Agent, or Firm* — MARSHALL, GERSTEIN & BORUN LLP

(57) ABSTRACT

A converter for generating photons from an electron beam is provided. The converter may include a plurality of converter plates (i) positioned perpendicular to an axis and (ii) arranged sequentially in a direction along the axis from a first converter plate of the plurality of converter plates to a last converter plate of the plurality of converter plates. The first converter plate may be configured to receive an electron beam traveling in the direction along the axis. Further, the first converter plate may have a thickness smaller than a thickness of the last converter plate, wherein a thickness of a particular converter plate is measured along the axis.

19 Claims, 6 Drawing Sheets

(56) References Cited

U.S. PATENT DOCUMENTS

| | | | | |
|---|---|---|---|---|
| 2014/0348284 | A1 | 11/2014 | Diamond et al. | |
| 2016/0040267 | A1* | 2/2016 | Stoner | G21G 1/12 204/157.21 |
| 2017/0251547 | A1* | 8/2017 | Ito | H05H 6/00 |
| 2017/0301426 | A1* | 10/2017 | Diamond | G21K 5/08 |
| 2018/0019034 | A1* | 1/2018 | Tsang | G21G 1/001 |
| 2019/0259505 | A1 | 8/2019 | Murakami et al. | |
| 2020/0029420 | A1 | 1/2020 | Ylimaki | |
| 2020/0043621 | A1 | 2/2020 | Comor et al. | |
| 2020/0066418 | A1* | 2/2020 | Rotsch | G21G 1/10 |
| 2020/0270722 | A1 | 8/2020 | Stoner et al. | |

OTHER PUBLICATIONS

Halbleib, J. A., G. J. Lockwood, and G. H. Miller. "Optimization of bremsstrahlung energy deposition." IEEE Transactions on Nuclear Science 23.6 (1976): 1881-1885. (Year: 1976).*

International Preliminary Report on Patentability, International Application No. PCT/US2022/038763, dated Feb. 15, 2024.

* cited by examiner

EFFICIENT BREMSSTRAHLUNG CONVERTER

STATEMENT REGARDING FEDERALLY SPONSORED RESEARCH OR DEVELOPMENT

This invention was made with government support under Contract No. DE-AC02-06CH11357 awarded by the United States Department of Energy to UChicago Argonne, LLC, operator of Argonne National Laboratory. The government has certain rights in the invention.

FIELD OF THE DISCLOSURE

The present disclosure relates to methods and systems for producing radioisotopes, and specifically, to converter apparatuses for converting electron beams to electromagnetic radiation.

BACKGROUND

Radioisotopes are used in a variety of applications, such as nuclear medicine, biomedical research, and aerospace technology. To produce such radioisotopes, an electron beam generated by an electron accelerator can be directed at a converter comprised of a material with a high atomic number (Z). The interaction of the high-energy electrons of the electron beam with the nuclei of the converter material produces high-energy photons, in a phenomenon referred to as bremsstrahlung. Photons produced by the converter then irradiate a target material placed downstream from the converter, where photonuclear reactions in the target material produce radioisotopes.

The photon-producing interaction between the electrons and the converter also deposits a significant amount of heat in the converter. As a result, the converter must be cooled (e.g., by passing water or gas over the surface of the converter). However, the heat deposited on the converter may exceed the capacity for the cooling mechanism to effectively cool the converter. Excessive heating may degrade the converter and/or may cause coolant to boil, further reducing the effectiveness of the coolant. Accordingly, there is a need for improved converters that can be effectively cooled without reducing radioisotope yield.

SUMMARY OF THE DISCLOSURE

In an example embodiment, a converter for generating photons from an electron beam is provided. The converter may include a plurality of converter plates (i) positioned perpendicular to an axis and (ii) arranged sequentially in a direction along the axis from a first converter plate of the plurality of converter plates to a last converter plate of the plurality of converter plates. The first converter plate may be configured to receive an electron beam traveling in the direction along the axis. Further, the first converter plate may have a thickness smaller than a thickness of the last converter plate, wherein a thickness of a particular converter plate is measured along the axis.

In another example embodiment, a system for producing radioisotopes is provided. The system may include a converter for generating photons from an electron beam. The converter may include a plurality of converter plates (i) positioned perpendicular to an axis and (ii) arranged sequentially in a direction along the axis from a first converter plate of the plurality of converter plates to a last converter plate of the plurality of converter plates. The first converter plate may be configured to receive an electron beam traveling in the direction along the axis. Further, the first converter plate may have a thickness smaller than a thickness of the last converter plate, wherein a thickness of a particular converter plate is measured along the axis. The system may also include a target housing positioned downstream of the converter, in the direction along the axis, such that photons produced by the converter using the electron beam irradiate the target housing.

In a further example embodiment, a method for producing radioisotopes is provided. The method may include directing an electron beam along an axis towards a converter configured to convert the electron beam into photons. The converter may include a plurality of converter plates (i) positioned perpendicular to an axis and (ii) arranged sequentially in a direction along the axis from a first converter plate of the plurality of converter plates to a last converter plate of the plurality of converter plates. The first converter plate may be configured to receive the electron beam traveling in the direction along the axis. Further, the first converter plate may have a thickness smaller than a thickness of the last converter plate, wherein a thickness of a particular converter plate is measured along the axis. The method may also include positioning, downstream of the converter in the direction of the axis, a target housing supporting a target such that the target is irradiated by photons produced by the converter.

BRIEF DESCRIPTION OF THE DRAWINGS

The Figures described below depict various aspects of the system and methods disclosed therein. It should be understood that each figure depicts an example of a particular aspect of the disclosed system and methods, and that each of the figures is intended to accord with a possible example thereof. Further, wherever possible, the following description refers to the reference numerals included in the following figures, in which features depicted in multiple figures are designated with consistent reference numerals.

There are shown in the drawing arrangements which are presently discussed, it being understood, however, that the present examples are not limited to the precise arrangements and instrumentalities shown, wherein.

DETAILED DESCRIPTION

Figure 1:
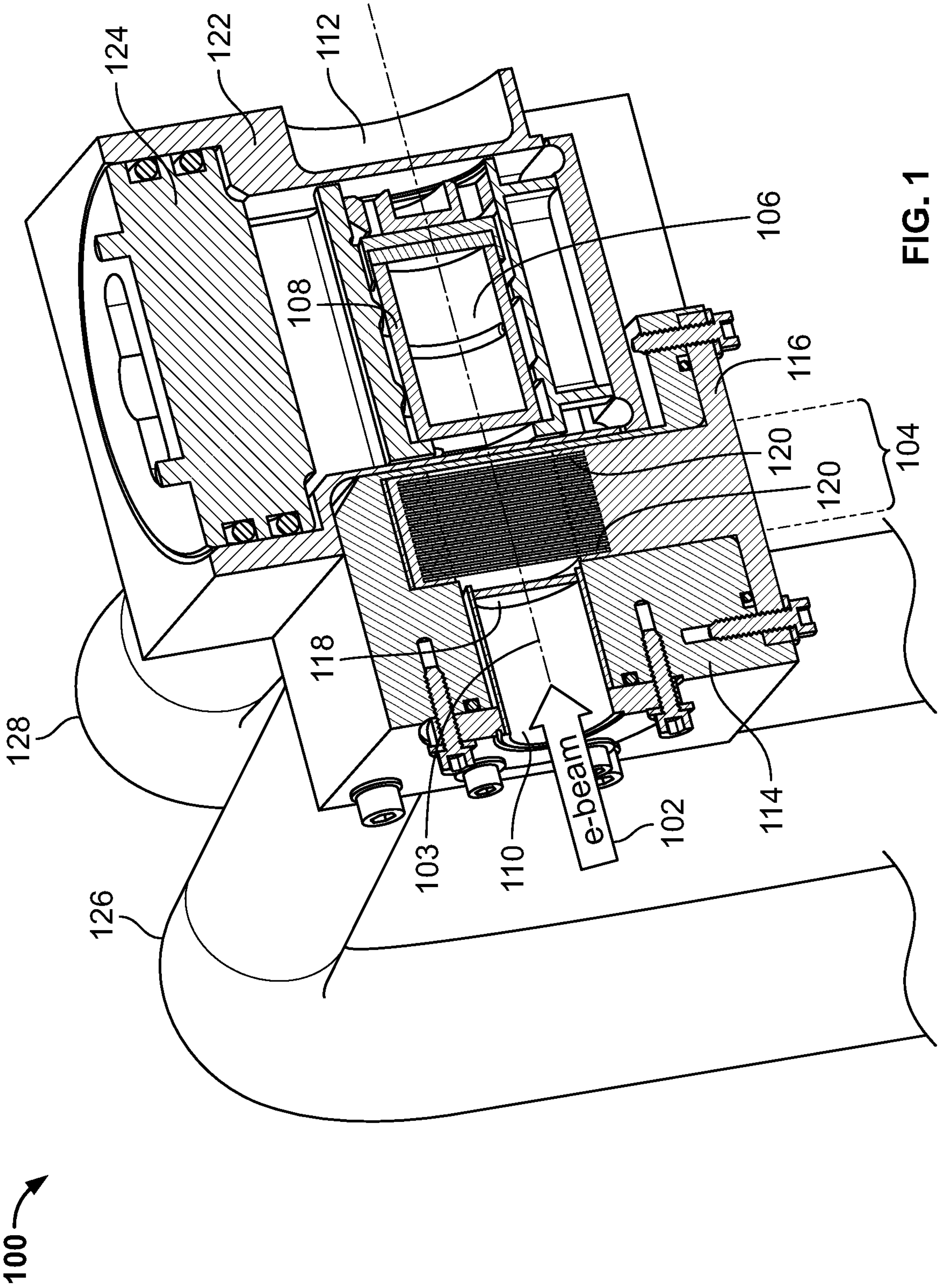
FIG. 1 is a cross-sectional view of an example system for producing radioisotopes, in accordance with some embodiments.

The present disclosure is directed to a converter design that improves both heat distribution within a converter and overall radioisotope yield. Converters are generally split up into a series of aligned, parallel converter plates to increase the surface area of the converter over which coolant can flow. However, in conventional converters, these converter plates have equal thicknesses. The converter design of this disclosure includes converter plates of different thicknesses. In particular, the thicknesses of the converter plates are optimized such that the peak heat density deposited in each plate due to an incoming electron beam is approximately equal. Such optimization more evenly distributes heat throughout the converter and reduces both the maximum and average temperature of the converter, compared to converter plates of equal thickness. Moreover, the converter design can result in fewer electrons reaching the target (downstream of the converter), depending on the total thickness of the converter plates, therefore reducing heat at the target and improving target survival. The converter design of this disclosure is primarily referred to with reference to FIGS. 2-3B. FIGS. 1 and 4 are included to illustrate systems in which a converter of this disclosure can operate.

Turning to the Figures, FIG. 1 is a cross-sectional view of an example system 100 for producing radioisotopes. It should be appreciated that the system 100 is merely an example and that alternative or additional components are envisioned. The system 100, which can also be referred to as a radioisotope target station, includes a converter 104 and a target capsule 108 having a cavity 106. The cavity 106 is adapted to receive a target, such that the target capsule 108 encapsulates the target. The target is a material that, when exposed to photons of the appropriate energy, may produce radioisotopes. Accordingly, the system 100 is positioned such that an electron beam 102 will impinge on the converter 104, and photons produced by the interaction of the electrons in the electron beam 102 with the converter 104 will irradiate the target to produce radioisotopes. Example radioisotopes that may be produced include Cu-67, Ac-225, Sc-47, Re-186, Re-188, Re-189, As-76, As-77, Lu-177, Rh-105, Au-196, Pt-195m, and combinations thereof. As such, the techniques of this disclosure can be used with a variety of different target materials to arrive at the desired target radioisotope.

The electron beam 102 may be produced by a particle accelerator, such as a linear accelerator (linac). The line along which the electron beam 102 travels may be referred to in this disclosure as an electron beam axis 103. The system 100 may be positioned along a beamline of the particle accelerator such that a tunnel defined by the system 100 is coaxial with the electron beam axis 103. The electron beam 102 enters the system 100 at an upstream end 110 of the tunnel. The electron beam 102 then passes through a beam entrance window 118. The beam entrance window 118 may be, for example, between 0.1 millimeters and 2 millimeters thick. Different materials, or window thicknesses or shapes, may be utilized to maximize heat transfer. Example materials include aluminum, titanium, copper, beryllium, and steel. After passing through the beam entrance window 118, the electrons are incident upon the converter 104.

The converter 104 includes a plurality of converter plates 120. The converter plates 120 may be supported by a converter carrier 116. For example, the converter carrier 116 may have a plurality of slots, where each slot receives a converter plate 120. As used herein, the converter 104 includes the converter plates 120 and the converter carrier 116. The system 100 includes a converter housing 114 that supports the converter carrier 116. As illustrated in FIG. 4, in some embodiments, the converter carrier 116 is removably received by the converter housing 114, such that the converter carrier 116 can be removed from the converter housing 114 (e.g., by sliding the converter carrier 116 out from the underside of the converter housing 114). In other embodiments, the converter carrier 116 is permanently fixed within the converter housing 114, or is part of the converter housing 114.

The converter plates 120 are arranged perpendicularly to the path of the electron beam 102 (i.e., perpendicular to the electron beam axis 103). Further, the converter plates 120 are arranged sequentially along the electron beam axis 103 and are parallel with each other. The converter plates 120 are aligned with each other along the electron beam axis 103, and may have the same height and width (i.e., dimensions as measured in a plane perpendicular to the electron beam axis 103). The thicknesses and relative positioning of the converter plates 120 are discussed in further detail below, with respect to FIG. 2, where a thickness of a converter plate 120 is measured along the electron beam axis 103. Each of the converter plates 120 may be comprised of a material having a high atomic number (Z) (i.e., a Z equal to or above 72). Example materials for the converter plates 120 include Tungsten (W), Tantalum (Ta), Gold (Au), Lead (Pb), or a combination of high-Z materials. In various embodiments, some converter plates 120 may be comprised of different materials than other converter plates 120. In other embodiments, each converter plate 120 may be comprised of the same material. In some embodiments, one or more converter plates 120 may be comprised of an alloy or other non-elemental material.

As the electron beam 102 travels through the converter plates 120, the electrons interact with the nuclei of the high-Z converter material to generate photons. As the electrons are slowed by the converter plates 120, the deceleration of the electrons produces electromagnetic radiation, referred to as bremsstrahlung radiation. Depending on the implementation, the converter 104 may be a full stopping converter or a non-full stopping converter. A full stopping converter stops all of the electrons within the converter (i.e., substantially all of the kinetic energy of incident electrons is converted into photon energy). Conversely, a non-full stopping converter allows the passage of electrons through the converter. The converter 104 may be a full stopping converter or a non-full stopping converter, depending on the particular application. Generally speaking, a full stopping converter includes a greater total thickness of converter material (i.e., the total thickness of the plurality of converter plates 120) than the non-full stopping converter. The converter plates 120 may or may not be contacting each other, depending on the implementation. Generally speaking, however, at least some of the converter plates 120 are arranged relative to each other to allow coolant (provided to the converter housing 114 by a coolant passage 126, discussed below) to flow between the converter plates 120.

Photons produced by the converter 104 travel towards the cavity 106, which is adapted to receive the target capsule 108, which in turn can support a target (not shown), where the target comprises the material in which the photonuclear reactions occur to produce the radioisotopes. Thus, the target is irradiated by the generated photons, which induces the photonuclear reactions in the target that produce the radioisotopes. The target may include material amounts ranging from milligrams to more than 100 grams, depending on the implementation. Further, the target material may be selected depending on the desired radioisotopes. For example, the target material may be Zinc (Zn)-68, which may produce Copper (Cu)-67 radioisotope. Any remaining photons, electrons, or other particles exit the tunnel at a downstream end 112 or scatter along the tunnel.

The target capsule 108 is supported by a target carrier 124, which may in turn be supported by a target housing 122. The target capsule 108 is received within the target carrier 124 such that the longitudinal axis of the target capsule 108 is coaxial with the electron beam axis 103. That is, the target housing 122 (and components supported by the target housing 122, including the target carrier 124 and the target capsule 108), are configured such that the target (which occupies the space within the cavity 106) is held within the tunnel coaxial with the electron beam axis 103. The target capsule 108, target carrier 124, and target housing 122 are further discussed in reference to FIG. 4.

Coolant passage 126 provides coolant to the converter housing 114, and coolant passage 128 provides coolant to the target housing 122. While not shown due to the cross-sectional view, the system 100 may also include outlet passages for each of the coolant passages 126, 128 to remove coolant from the system 100. Accordingly, coolant can flow through the coolant passage 126, through the converter 104, and exit via an outlet passage (not shown). Similarly, coolant can flow through the coolant passage 128, through the target housing 122, and exit via an outlet passage (not shown). The coolant may pass through both the converter housing and the target housing in succession or individually. After coolant is received at the converter housing 114 from the coolant passage 126, the coolant may be routed, via fluid channels, through components of the converter 104 in order to cool the converter 104, before flowing out of the converter housing 114 via an outlet passage. In particular, the coolant may be directed through spacings between adjacent converter plates 120. The coolant may come into direct contact with the converter plates 120. Similarly, after coolant is received at the target housing 122, the coolant may be routed, via fluid channels, through components of the target housing 122 before flowing out of the target housing 122 via an outlet passage. For example, the target capsule 108 may come into direct contact with the coolant.

The coolant is generally a fluid, such as water, ethylene glycol, diethylene glycol, propylene glycol, or combinations thereof. The coolant carried by the coolant passage 126 may be different from the coolant carried by the coolant passage 128, depending on the implementation. Generally, the coolant traverses the converter housing 114 and the target housing 122 at a rate and a temperature in order to maintain the temperature of the housings 114, 122 below the boiling point of the coolant and/or below the melting point of the lowest melting point constituent of the housings 114, 122. For example, in instances where water is used as a coolant, temperatures are maintained such that the water remains below 100° C. In instances where the converter housing 114 or target housing 122 is comprised of aluminum, the temperature of the converter housing 114 or target housing 122 is maintained below about 600° C., given that aluminum melts at 660° C. The rate, temperature, and type of coolant for each of the converter housing 114 and the target housing 122 may be different, depending on the desired temperature of each respective housing 114, 122. Alternatively or in addition, portions of the system 100 may be adapted to receive pressurized gas as the coolant, such as a pressurized Helium. For example, in some implementations, the converter plates 120 may be cooled by gas moving at a high rate across the converter plates 120.

Figure 2:
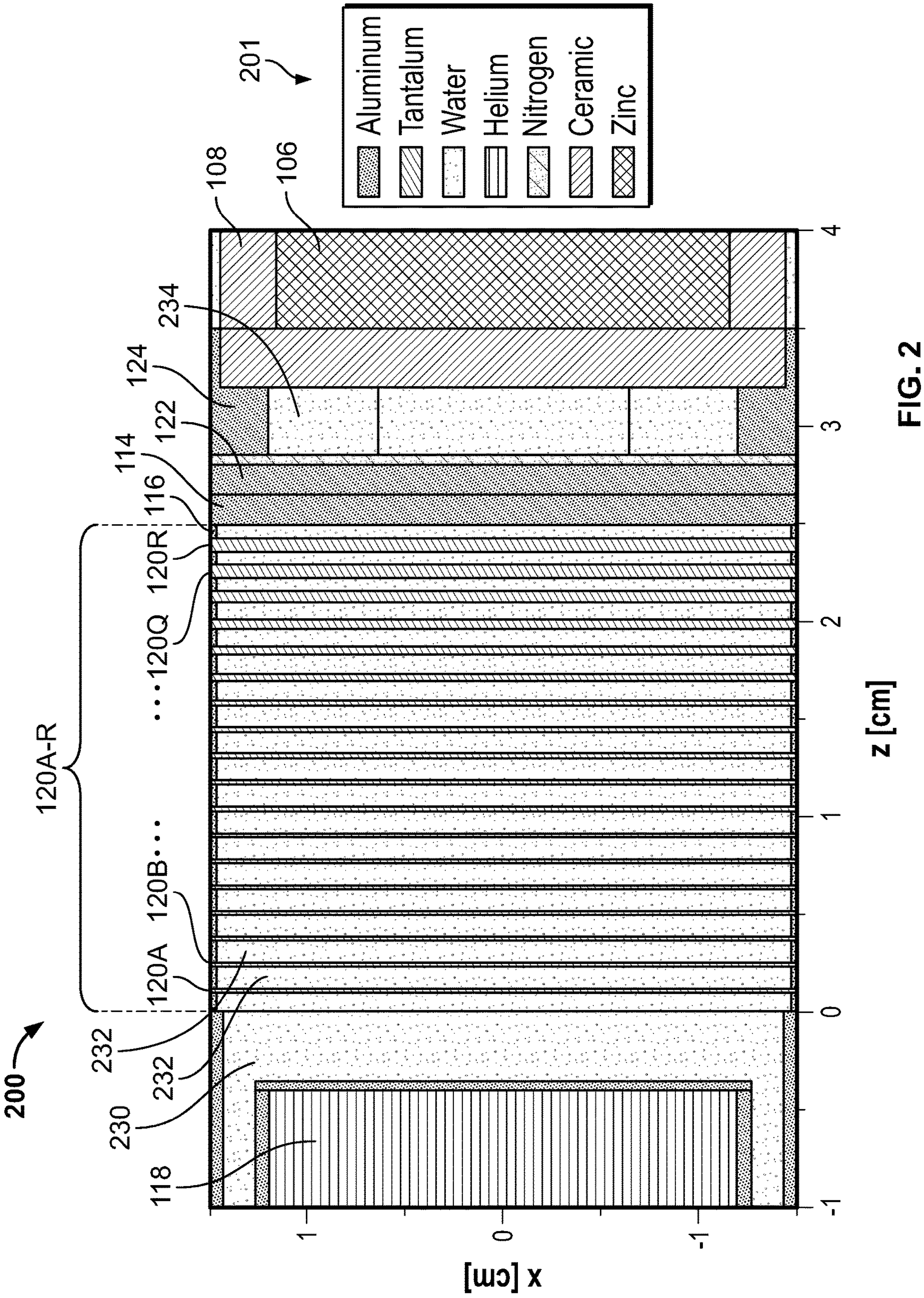
FIG. 2 is cross-sectional view of an example converter, which may be included in the system of FIG. 1.
Figure 3A:
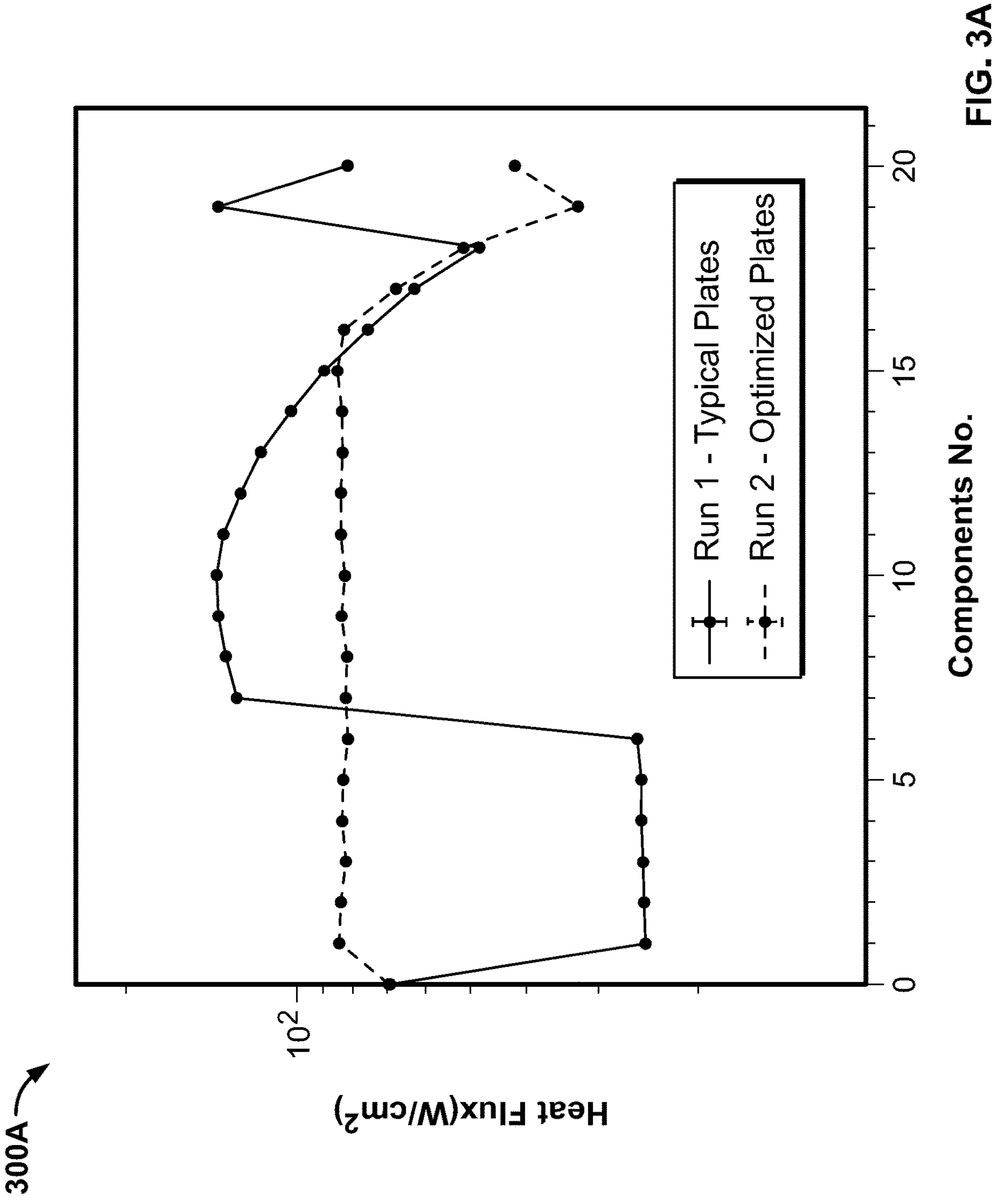
FIG. 3A is an example graph illustrating heat flux at varying distances from an electron beam source, for a typical converter and for a converter configured in accordance with the techniques of this disclosure, such as the converter of FIG. 2.

Turning now to FIG. 2, the converter design of this disclosure is discussed. FIG. 2 is cross-sectional view of an example converter 200, which may be included in the system 100 of FIG. 1. FIG. 2 therefore may represent a zoomed-in view of the converter 104 in FIG. 1. Nonetheless, while the converter 200 is described with reference to the system 100, it should be understood that the converter 200 can be included in any system that includes a converter for converting a particle beam into photons.

FIG. 2 also includes an index 201 indicating example materials that may comprise the components of the converter 200 illustrated in FIG. 2. In the case of the sections illustrated as including water (e.g., passages 230, 232, 234), the sections may be passages defined by components of the system 100 through which coolant, such as water, can flow. Similarly, in the case of the sections illustrated as including helium and nitrogen, the sections may be passages in which a pressurized gasses, such as helium or nitrogen, may be present. As indicated by the index 201, the converter carrier 116, the converter housing 114, and the target carrier 124 may be comprised of and/or shielded using Aluminum (Al). The beam entrance window 118 may also be shielded with Al. The target capsule 108 may be comprised of ceramic. In other embodiments, the target capsule 108 may be comprised of another material suitable for separating the target from coolant or simply containing the target.

FIG. 2 further includes a horizontal axis indicating example component thicknesses in centimeters, where a thickness is measured along the electron beam axis 103. The horizontal axis of FIG. 2 is therefore parallel with the electron beam axis 103. FIG. 2 also includes a vertical axis indicating example component heights in centimeters. On the vertical axis, the center of the electron beam 102 is located at a height of approximately 0 cm.

FIG. 2 illustrates both the converter 200 and other components of the system 100, where the other components are illustrated such that the converter 200 can be viewed in the context of the system 100. The converter 200 includes the converter plates 120 and the converter carrier 116 that supports the converter plates 120. Coolant, corresponding to water in FIG. 2, may flow between the beam entrance window 118 and the converter 200 in a passage 230, between the converter plates 120 in passages 232, and in a front flow channel 234 defined by the target carrier 124 and the target capsule 108.

In the example depicted in FIG. 2, there are 18 converter plates, labeled from 120A to 120R, such that a first converter plate (the converter plate that is the most upstream and closest to the beam entrance window 118), is labeled with reference number 120A, the second converter plate is labeled with reference number 120B, and so on. The second-to-last converter plate is labeled with reference number 120Q, and the last converter plate (the converter plate that is the most downstream and closest to the target capsule 108) is labeled with reference number 120R. The converter plates 120A-120R are arranged perpendicular to the electron beam axis 103, where the electrons of the electron beam 102 travel horizontally from left to right in FIG. 2. The converter plates 120 are separated by a distance of approximately 1 mm (i.e., 1 mm+/−0.5 mm). In some embodiments, the spacing between at least some of the converter plates 120 may be different. In other embodiments, the spacing between the converter plates 120 is the same.

The electron beam 102 passes through the beam entrance window 118 and is received by the first converter plate 120A. The electron beam 102 continues to travel through the remaining converter plates 120B-120R. As the electron beam 102 passes through the converter plates 120, electrons are stopped due to the kinetic energy of the electrons being converted into photons. The photons travel downstream and irradiate the target capsule 108, and, in turn, the target within the cavity 106 of the target capsule 108. In the example of FIG. 2, the target is comprised of zinc.

As briefly discussed above, conventionally, converter plates are the same thickness. However, this results in a large amount of heat deposited on the first few converter plates because the electron beam 102 is narrowest at the first, i.e., most upstream, converter plate. This effect is illustrated by simulations performed by the Applicant, shown in FIG. 3A. In FIG. 3A, heat flux (in Watts per square centimeter) is plotted as a function of the component number, where the heat flux represents the heat deposited on the component (i.e., the converter plate) as a result of the electron beam. For the converter to operate effectively, this heat should be carried away from the converter plates by the coolant flowing between the plates. However, excessive heat can exceed the capacity of the coolant, resulting in heat buildup within the converter and possibly resulting in boiling of the coolant, destruction of the converter plates, and/or destruction of the converter housing.

In FIG. 3A, the component number increases in the downstream direction. Accordingly, the beam entrance window 118 corresponds to component zero, the first slot in which a converter plate can be placed (i.e., the first slot in the converter carrier 116) corresponds to component one, and so on. The eighteenth slot at which a converter plate can be placed corresponds to component 18, the entrance to the target carrier 124 corresponds to component 19, and the target capsule 108 corresponds to component 20.

Run 1 in FIG. 3A corresponds to simulated data for typical converter plates—i.e., converter plates having the same thicknesses. For run 1, aluminum plates were placed in slots 1-6. Having a low Z, aluminum allows most electrons to pass through without much interaction and thus minimal heat is deposited. The aluminum was placed to maintain the equal flow of coolant between all plates. Accordingly, the most upstream converter plate is located in slot 7. As can be seen in FIG. 3A, this most upstream converter plate has a large heat flux (greater than 100 W/cm$^2$). The heat flux increases with each successive converter plates, peaking at the converter plate placed at slot 10. The heat flux then falls for the remaining converter plates.

However, turning back to FIG. 2, in contrast to conventional converter plates, at least a portion of the converter plates 120 have different thicknesses. Furthermore, the thicknesses of the converter plates 120 have been optimized such that the same energy density is deposited on each converter plate 120. Thus, for each converter plate 120, the coolant flowing in the spacing between adjacent converter plates 120 removes the same amount of heat.

Generally, the optimized converter design of this disclosure includes a first converter plate that has a smaller thickness than the last converter plate. Thus, the first converter plate 120A has a smaller thickness than the converter plate 120R. The converter plates 120B-120Q do not, however, necessarily constantly increase in thickness. Due to an effect known as an electron shower, the highest amount of energy is not necessarily deposited at the first converter plate 120A. As electrons strike the first converter plate 120A, the impinging electrons may produce additional electrons or particles, which travel downstream and strike the second converter plate 120B. To compensate for this effect, the second converter plate 120B may have a smaller thickness than the first converter plate 120A. Likewise, the third converter plate 120C may have a smaller thickness than the second converter plate 120B. The thicknesses of the third through sixth converter plates 120C-120F may have the same thickness. The thickness of the seventh converter plate 120G may be the same as the thickness of the second converter plate 120B (and therefore larger than the thickness of the sixth converter plate 120F). The thickness of the eighth converter plate 120H may be the same as the thickness of the first converter plate 120A. The thickness of the ninth converter plate 120I may be greater than the thickness of the eighth converter plate 120H. The thicknesses of the tenth converter plate 120J through the eighteenth converter plate 120R may be ascending in size (i.e., thickness of the eighteenth converter plate 120R>thickness of the seventeenth converter plate 120Q>thickness of the sixteenth converter plate 120P> . . . >thickness of the eleventh converter plate 120K>thickness of the tenth converter plate 120J).

Turning back to FIG. 3A, run 2 corresponds to simulated data for optimized plates, i.e., the converter plates 120. In contrast to run 1, there are converter plates in each of the eighteen slots. Accordingly, the first converter plate 120A is component number 1. While there are fewer converter plates in run 1 than run 2 (as less slots are used in run 1 than run 2), the total converter thickness is the substantially the same in run 1 and run 2. In contrast to run 1, the heat flux per square centimeter is substantially constant across the majority of the converter plates. There is a decrease in heat flux density after the sixteenth converter plate 120P, due to the drop in electron energy as the electrons pass through the converter plates 120. Advantageously, in addition to the heat flux density remaining constant, the maximum heat flux density is also lower for the optimized plates than for the conventional plates. In addition, FIG. 3A also indicates that fewer electrons are able to pass through the converter plates 120 in comparison to the conventional plates. As a result, the heat flux density at the target capsule 108 component no. 20) is lower for the converter plates 120 than for the conventional plates. Heating of the target can cause degradation or melting of the target, resulting in lower yields of produced radioisotopes. Compared to conventional plates, the optimized plates have a lower maximum heat flux density, lower average heat flux density, and more evenly distributed heat flux density, and can therefore be more efficiently cooled. Moreover, the optimized plates enhance the radioisotope yield by enabling higher electron fluxes to bombard the converter without causing damage to the converter.

Figure 3B:
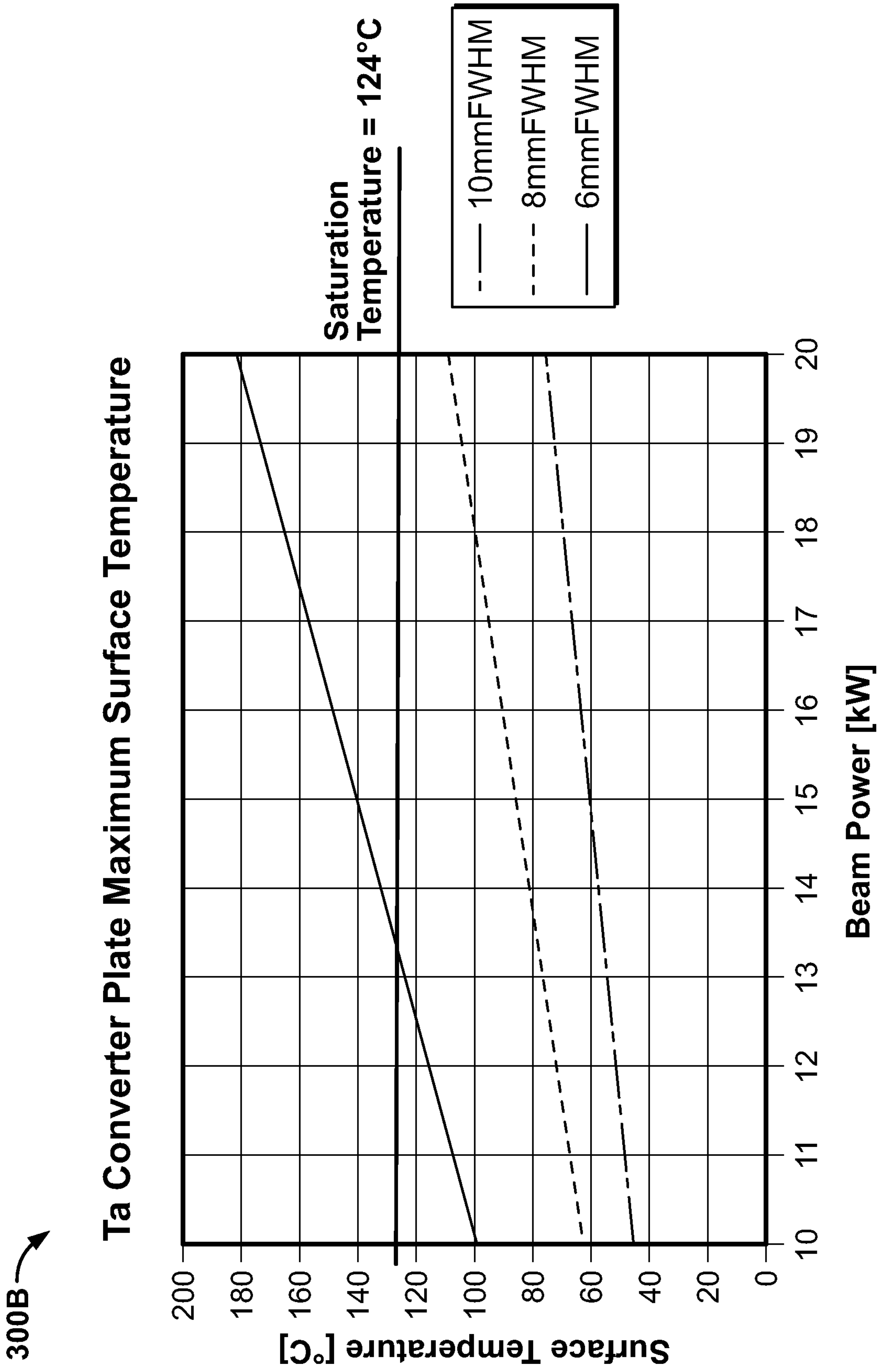
FIG. 3B is an example graph illustrating converter plate temperature as a function of beam power.
Figure 4:
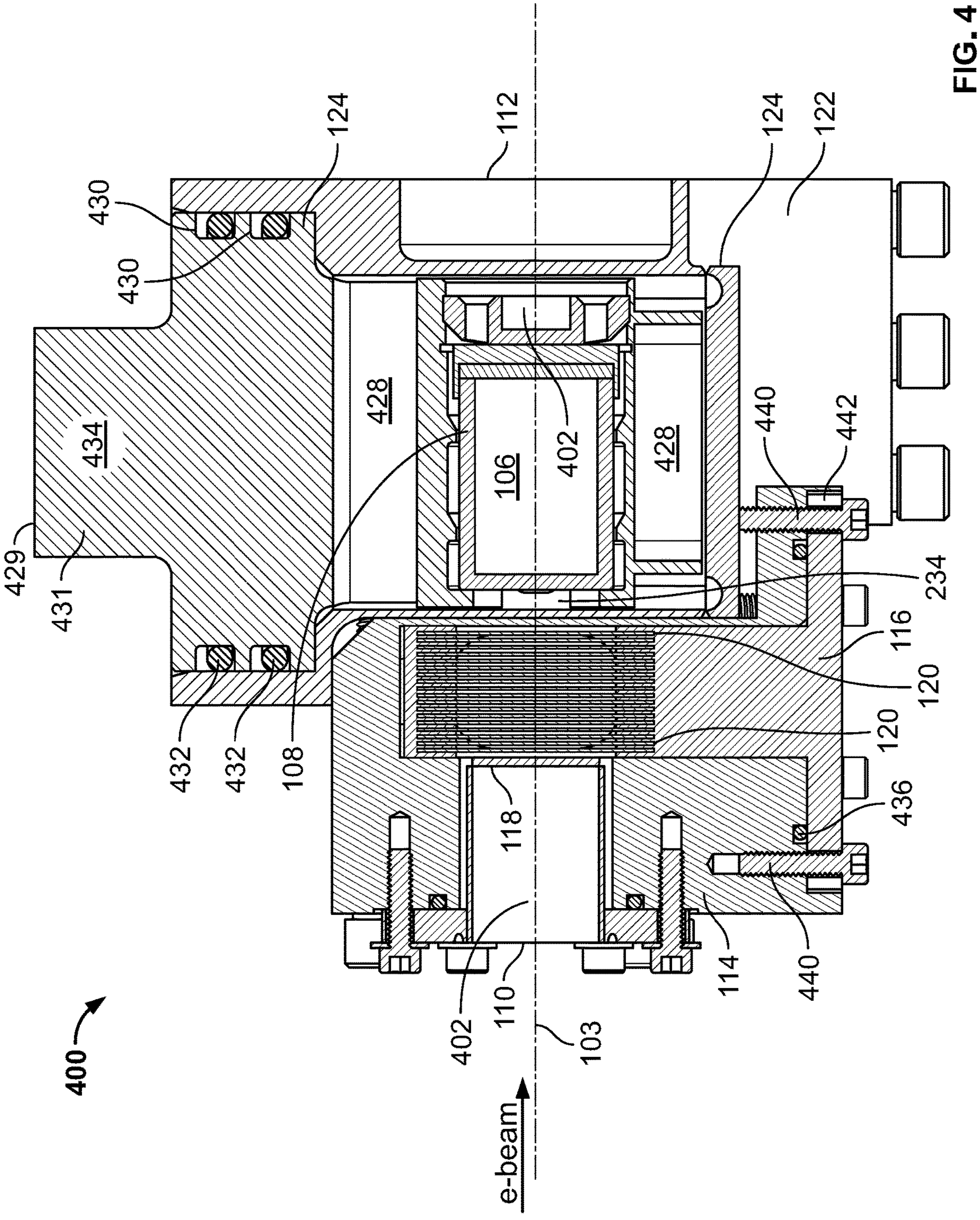
FIG. 4 is a cross-sectional view of an example modular system for producing radioisotopes, which may be the system illustrated in FIG. 1.

Further, turning to FIG. 3B, the optimized design of the converter plates 120 also increases the maximum beam power that can be utilized, in comparison to conventional plates. FIG. 3B illustrates experimental data gathered by the Applicant using thermocouples placed on the converter plates 120. The horizontal axis is beam power (kW), and the vertical axis is temperature (° C.). The plots correspond to a maximum surface temperature of a converter plate of the converter plates 120. The saturation temperature, marked as 124° C., corresponds to an upper limit on the desired temperature. This upper limit is chosen for a particular coolant, in this case water. Further, the upper limit is selected based on estimations for the energy deposited on the converter plates 120 and the amount of heat that can be removed by the coolant, which depends on the flow rate of the coolant. Below this upper limit, incipient boiling of the coolant moving past the converter plates 120 is avoided. Above this upper limit, the coolant may boil. Different upper limits may be selected based on the coolant and the heat tolerance of the particular application.

FIG. 3B shows three data sets corresponding to surface temperature of a converter plate 120 as a function of beam power for electron beams having three different beam widths (measured as the full width at half maximum (FWHM)): 10 mm, 8 mm, and 5 mm. Converter plate 120 temperatures can be measured by placing thermocouple(s) on the converter plate 120. As illustrated in FIG. 3B, use of the optimized converter plates 120 enables use of beam powers up to at least 20 kW, for beam widths of 8 mm and 10 mm. Even at 20 kW, the surface temperature of the converter plate remains below the saturation temperature for beam widths of 8 mm and 10 mm. For beam widths of 6 mm, the surface temperature of the converter plate remains below the saturation temperature up to a beam power of approximately 13.5 kW. Due to the optimized nature of the converter plates 120, higher beam powers can be used than for conventional plates, which lead to higher yields for the radioisotopes.

Table 1 provides example thickness measurements of the converter plates 120. The thicknesses may vary depending on the properties of the electron beam 102. In particular, a different amount of total converter thickness (i.e., the sum of the thicknesses of the individual converter plates) is required for a different beam energy in order to have a full stopping converter. That is, for a larger beam energy, a larger total converter thickness is required than for a smaller beam energy. Example total converter thicknesses may be between 1 mm and 10 mm, depending on the beam energy, and example individual converter plate thicknesses may be between 0.1 mm and 2 mm, depending on the total number of plates. Example converter plate thickness measurements for a 40 MeV electron beam and a 35 MeV electron beam are shown below in Table 1.

TABLE 1

Converter Plate Example Thicknesses
CONVERTER PLATE THICKNESSES (mm)

| | 40 MeV Electron Beam | 35 MeV Electron Beam |
|---|---|---|
| Converter Plate 120A | 0.23 | 0.2 |
| Converter Plate 120B | 0.22 | 0.19 |
| Converter Plate 120C | 0.21 | 0.18 |
| Converter Plate 120D | 0.21 | 0.18 |
| Converter Plate 120E | 0.21 | 0.18 |
| Converter Plate 120F | 0.21 | 0.18 |
| Converter Plate 120G | 0.22 | 0.19 |
| Converter Plate 120H | 0.23 | 0.2 |
| Converter Plate 120I | 0.25 | 0.22 |
| Converter Plate 120J | 0.27 | 0.24 |
| Converter Plate 120K | 0.3 | 0.26 |
| Converter Plate 120L | 0.33 | 0.29 |
| Converter Plate 120M | 0.37 | 0.32 |
| Converter Plate 120N | 0.44 | 0.39 |
| Converter Plate 120O | 0.48 | 0.42 |
| Converter Plate 120P | 0.58 | 0.51 |
| Converter Plate 120Q | 0.6 | 0.53 |
| Converter Plate 120R | 0.64 | 0.56 |

The example thicknesses shown in the first column of Table 1 are optimized thicknesses for 18 converter plates comprised of Tantalum (Ta), an electron beam having an energy of 40 MeV, and a target material of Zn-68, with an objective of producing Cu-67 radioisotopes. The example thicknesses shown in the second column are optimized thicknesses for the same set of experimental parameters, except where the electron beam has an energy of 35 MeV. The thicknesses for the 35 MeV electron beam can be derived by multiplying the thicknesses for the 40 MeV electron beam by 7/8 (i.e., by the ratio of the beam energies, 35 MeV/40 MeV. Accordingly, based on the example measurements given in Table 1, other example measurements can be derived for other beam energies.

The thicknesses of the converter plates 120 can be optimized for any experimental setup, and may vary depending on the implementation (e.g., on parameters such as the strength and size of the electron beam, the target material, the desired radioisotopes, the converter material, the coolant material/method, etc.). As one example, if more than 18 slots are available in the converter carrier 116 (or other suitable apparatus that receives the converter plates), there may be more than 18 plates. Conversely, if less than 18 slots are available in the converter carrier 116 (or other suitable apparatus that receives the converter plates), there may be less than 18 plates. The thicknesses of the converter plates 120 can therefore be adjusted for more or less plates 120, where the total converter thickness is kept constant (e.g., thick enough to serve as a full stopping converter, depending on the application). In these examples, the first converter plate 120 would still be smaller in thickness than the last converter plate 120. The second converter plate 120 may have a smaller thickness than the first converter plate 120. In the case where there are more than 18 plates, the third converter plate 120 may have a smaller thickness than the second converter plate 120, and the fourth converter plate 120 may have a smaller thickness than the third converter plate 120. One or more converter plates 120 (e.g., starting with the fourth converter plate 120) may have the same thicknesses. In the case where there are more than 18 plates, the third converter plate 120 may have a smaller thickness than the second converter plate 120, or may have the same thickness as the second converter plate 120. One or more converter plates 120 (e.g., starting with the second or third converter plate 120) may have the same thicknesses. In either example (i.e., more or less than 18 plates) two or more of the last converter plates 120 may have ascending thicknesses, such that the last converter plate 120 has the greatest thickness.

As another example, while the above discussion primarily focuses on a full stopping converter, the converter design of this disclosure can also be adapted to provide a non-full stopping converter. For instance, downstream plates can be removed or replaced with a low Z material (i.e., aluminum) until a desired number of electrons can pass through the converter.

Generally speaking, in accordance with the converter design of this disclosure, converter plates are optimized such that energy density (or heat flux per square centimeter) deposited on each converter plate is the same. This optimization results in a first converter plate that has a smaller thickness than the last converter plate. The second converter plate may have a thickness that is smaller than the thickness of the first converter plate. One or more plates downstream of the second converter plate (e.g., the third converter plate through the sixth converter plates) may have the same thickness, which may be smaller than the thickness of the second plate. After the sixth converter plate, converter plate thicknesses may increase, such that the last converter plate has the largest thickness of the converter plates.

FIG. 4 is a cross-sectional view of an example system 400 for producing radioisotopes. The system 400 may be the system 100 illustrated in FIG. 1, but FIG. 4 is provided in addition to FIG. 1 to provide a more detailed view of the system 100. The system 400 is one example radioisotope target station in which the converter design of this disclosure can be utilized (i.e., the converter design described with reference to FIG. 2). However, it should be understood that the converter design of this disclosure can be utilized in any suitable system, i.e., in any suitable system having a converter configured to convert an incident particle beam into electromagnetic radiation. For example, while the example system 400 is a modular system having a target carrier and converter carrier in slidable communication with respective housings, the converter design of this disclosure can also be readily utilized in a non-modular system. As mentioned previously, the system 400 may be positioned along a beamline of the particle accelerator such that a tunnel 402 defined by the system 400 is coaxial with the electron beam axis 103. The electron beam 102 enters the system 400 at an upstream end 110 of the tunnel 402, passes through the beam entrance window 118, and is received by the converter plates 120, which convert the electron beam 102 into photons that irradiate a target within the target capsule 108. Any remaining photons, electrons, or other particles exit the tunnel 402 at a downstream end 112 or scatter along the tunnel 402.

In the modular system 400 depicted in FIG. 4, the target carrier 124 and the converter carrier 116 are configured to be removably received by the target housing 122 and the converter housing 114, respectively. The modular design allows the system 400 to be adapted to changing project and beam line configurations. For different applications, the target carrier 124 and/or the converter carrier 116 can be removed from the target housing 122 and/or the converter housing 114, respectively, and configured in accordance with desired experimental objectives.

The target carrier 124, for example, can be removed from the target housing 122 for retrieval of the target capsule 108. With the exception of the beam entrance window 118, which includes a narrow gap that allows the electron beam to enter the converter housing 114, the target housing 122 and the converter housing 114 are shielded. The shielding minimizes any potential radiation dose to workers during retrieval of the target capsule 108 (and the target supported therein). Further, in some embodiments, the target carrier 124 may be retrieved by remote actuation of a mechanical arm that raises the target carrier 124 out of the target housing 122 and into a shielded transfer cask. In such embodiments, the worker is not exposed to a direct irradiation environment caused by the target or the converter 104.

The target carrier 124 may be in slidable communication with the target housing 122, such that the target carrier 124 can be slid in and out of the target housing 122 via the top portion of the target housing 122. The top-loading configuration allows "hot swapping" of the irradiated target for a new target, where the irradiated target may subsequently be placed into a standard hot cell. The target carrier 124 is adapted to receive the target capsule 108.

The target carrier 124 may be hermetically sealed with the target housing 122. For example, in some embodiments, the target carrier 124 may include annular grooves 430, where the annular grooves 430 may be adapted to receive O-rings 432. The O-rings 432 may be adapted to frictionally engage medially facing surfaces of the target housing 122. In other embodiments, the target carrier 124 may seal with the target housing 122 via a male-female thread and groove configuration.

A superior end 429 of the target carrier 124 may define an upwardly projecting tongue 431 with a region forming an aperture 434. The aperture 434 may serve as a grasping point for a crane or other means for removing the target carrier 124 from, or inserting the target carrier 124 into, the target housing 122.

The target carrier 124 is generally configured to stabilize the target capsule 108 (and target material within the target capsule 108) in relation to the electron beam axis 103 when coolant is flowing over the target capsule 108. The target capsule 108 may be removably secured within the target carrier 124 via a fastening means. The fastening means is to prevent rattling of the target capsule 108 within the target carrier 124 during coolant operations. A suitable fastening means is a male-female threaded configuration, whereby, for example, circumferential surfaces of the target capsule 108 are threadably received by medially facing surfaces of the target carrier 124.

While illustrated as separate components in FIGS. 1 and 4, in some implementations, the converter housing 114 and the target housing 122 may be integrally molded as one piece. The target carrier 124 and the converter carrier 116 may in turn be removably received by such a piece.

Coolant, received from the coolant passage 126, may flow through channels in the converter housing 114. For example, coolant may flow between the beam entrance window 118 and the first converter plate of the converter plates 120, between the converter plates 120, and/or between the last converter plate and the converter carrier 116 or converter housing 114. The front flow channel 234 and target housing channels 428 may be formed within the target housing 122 and may carry coolant provided by the coolant passage 128. Other passages (not labeled), which may not be shown by FIG. 4, may be present within the housings 114, 122 to carry coolant throughout the system 400.

The converter plates 120 may be positioned on a pedestal formed by the converter carrier 116. During operation of the electron beam, the converter carrier 116 may be sealed to the converter housing 114 by one or a plurality of O-rings 436 (e.g., metal O-rings, such as Aluminum (Al) or Gold (Au) O-rings). The O-rings 436 may be received by annular grooves formed in the converter carrier 116. Transverse apertures 442 may be formed in regions of the converter carrier 116 and in registration with depending surfaces of the converter housing 114. The transverse apertures 442 may be adapted to receive fasteners 440, such as screws, which fasten the converter carrier 116 to the converter housing 114.

The converter carrier 116 may be removably received by the converter housing 114. Accordingly, the converter carrier 116 may be removed from the converter housing 114, and the converter plates 120 held by the converter carrier 116 may be replaced, removed, interchanged, or moved. As mentioned previously, the converter carrier 116 may have slots which receive the converter plates 120. Some of the slots may be unoccupied by a converter plate 120, depending on the implementation. Further, the converter carrier 116 itself may be removed from the converter housing 114 and replaced with a different converter carrier having different converter plates. The converter carrier 116 may be in thermal communication with the converter housing 114 so as to receive the benefit of coolant flowing through the converter housing 114. Alternatively or in addition, the converter carrier 116 may define passages for coolant.

Figure 5:
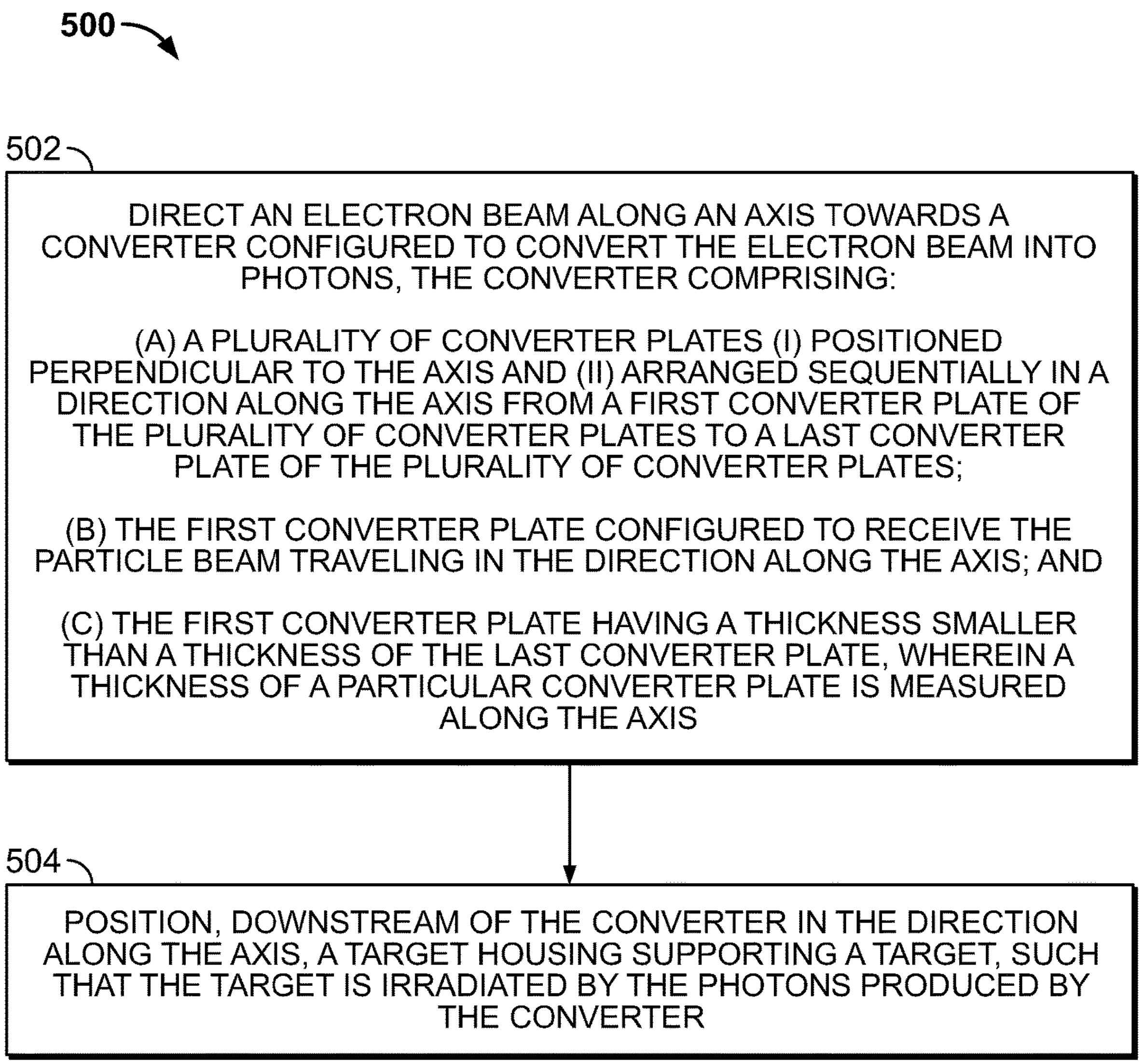
FIG. 5 is a flow diagram of an example method for producing radioisotopes.

FIG. 5 is a flow diagram of an example method 500 for producing radioisotopes. At block 502, the method 500 includes directing an electron beam (e.g., the electron beam 102) along an axis (e.g., the electron beam axis 103) towards a converter (e.g., the converter 104) configured to convert the electron beam into photons. The converter includes a plurality of converter plates (e.g., the converter plates 120) (i) positioned perpendicular to the axis and (ii) arranged sequentially in a direction along the axis from a first converter plate of the plurality of converter plates (e.g., the converter plate 120A) to a last converter plate of the plurality of converter plates (e.g., the converter plate 120R). The first converter plate is configured to receive the electron beam traveling in the direction along the axis. Further, the first converter plate (e.g., the converter plate 120A) has a thickness smaller than a thickness of the last converter plate (e.g., the converter plate 120R), where a thickness of a particular converter plate is measured along the axis.

In some implementations, at least three of the plurality of converter plates are positioned in order of ascending thickness in the direction along the axis (e.g., the converter plates 120P-R in the example measurements of Table 1). Each of the at least three of the plurality of converter plates may have a different thickness. In some implementations, the thickness of the last converter plate is a largest thickness of the plurality of converter plates.

In various implementations, a thickness of a second converter plate, positioned after (i.e., downstream) the first converter plate and before the last converter plate in the direction along the axis (e.g., the converter plate 120B or the converter plate 120A), is smaller than the thickness of the first converter plate. In such implementations, at least two of the plurality of converter plates may be (i) positioned after the first converter plate along the axis and (ii) positioned in order of ascending thickness in the direction along the axis.

The converter may further include a converter carrier (e.g., the converter carrier 116) adapted to support the plurality of converter plates. The converter carrier may be removably received by a converter housing (e.g., the converter housing 114). For example, the converter carrier may be in slidable communication with the converter housing.

Depending on the implementation, adjacent converter plates of the plurality of converter plates may be spaced between 0.5 mm and 1.5 mm apart along the axis (e.g., adjacent converter plates may be spaced approximately 1 mm apart). The converter may be adapted to receive a coolant fluid, such as water, between adjacent converter plates of the plurality of converter plates. Each of the plurality of converter plates may have a thickness between 0.1 mm and 2 mm, depending on the implementation and depending on how far upstream or downstream the converter plate is located relative to other converter plates of the plurality of converter plates. A total thickness, equal to the sum of thicknesses of the plurality of converter plates, may be between approximately 1-10 mm. Further, each of the plurality of converter plates may comprise a material within an atomic number equal to or above 72, such as W, Ta, Au, Pb, or a combination of these elements.

At block 504, the method includes positioning, downstream of the converter in the direction along the axis, a target housing (e.g., the target housing 122) supporting a target (e.g., a target material encapsulated by the target capsule 108) such that the target is irradiated by the photons produced by the converter. The target produces radioisotopes in response to irradiation by the photons. In some implementations, the target housing comprises a target carrier (e.g., the target carrier 124) that supports the target. The target carrier may be removably received by the target housing. The target carrier, for example, may be in slidable communication with the target housing.

Aspects

The following list of aspects reflects a variety of the embodiments explicitly contemplated by the present application. Those of ordinary skill in the art will readily appreciate that the aspects below are neither limiting of the embodiments disclosed herein, nor exhaustive of all the embodiments conceivable from the disclosure above, but are instead meant to be exemplary in nature.

Aspect 1. A converter for generating photons from an electron beam, the converter comprising: a plurality of converter plates (i) positioned perpendicular to an axis and (ii) arranged sequentially in a direction along the axis from a first converter plate of the plurality of converter plates to a last converter plate of the plurality of converter plates; the first converter plate configured to receive an electron beam traveling in the direction along the axis; and the first converter plate having a thickness smaller than a thickness of the last converter plate, wherein a thickness of a particular converter plate is measured along the axis.

Aspect 2. The converter of aspect 1, wherein at least three of the plurality of converter plates are positioned in order of ascending thickness in the direction along the axis.

Aspect 3. The converter of aspect 2, wherein each of the at least three of the plurality of converter plates has a different thickness.

Aspect 4. The converter of aspect 1, wherein the thickness of the last converter plate is a largest thickness of the plurality of converter plates.

Aspect 5. The converter of aspect 1, wherein: a thickness of a second converter plate, positioned after the first converter plate and before the last converter plate in the direction along the axis, is smaller than the thickness of the first converter plate.

Aspect 6. The converter of aspect 5, wherein: at least two of the plurality of converter plates are (i) positioned after the second converter plate along the axis and (ii) positioned in order of ascending thickness in the direction along the axis.

Aspect 7. The converter of aspect 1, further comprising: a converter carrier adapted to support the plurality of converter plates, the converter carrier adapted to be in slidable communication with a converter housing.

Aspect 8. The converter of aspect 1, wherein adjacent converter plates of the plurality of converter plates are spaced between 0.5 millimeters and 1.5 millimeters apart along the axis.

Aspect 9. The converter of aspect 1, wherein each of the plurality of converter plates has a thickness between 0.1 millimeters and 2 millimeters.

Aspect 10. The converter of aspect 1, wherein a total thickness equal to a sum of thicknesses of the plurality of converter plates is between 1 millimeter and 10 millimeters.

Aspect 11. The converter of aspect, wherein the converter is adapted to receive coolant fluid between adjacent converter plates of the plurality of converter plates.

Aspect 12. The converter of aspect 1, wherein each of the plurality of converter plates comprises a material with an atomic number equal to or above 72.

Aspect 13. A system for producing radioisotopes, the system comprising: a converter for generating photons from an electron beam, the converter comprising: a plurality of converter plates (i) positioned perpendicular to an axis and (ii) arranged sequentially in a direction along the axis from a first converter plate of the plurality of converter plates to a last converter plate of the plurality of converter plates; the first converter plate configured to receive an electron beam traveling in the direction along the axis; and the first converter plate having a thickness smaller than a thickness of the last converter plate, wherein a thickness of a particular converter plate is measured along the axis; and a target housing positioned downstream of the converter, in the direction along the axis, such that photons produced by the converter using the electron beam irradiate the target housing.

Aspect 14. The system of aspect 13, wherein the target housing supports a target that produces the radioisotopes in response to irradiation by the photons.

Aspect 15. The system of aspect 13, wherein: the target housing comprises a target carrier that supports a target that produces the radioisotopes in response to irradiation by the photons; and the target carrier is removably received by the target housing.

Aspect 16. The system of aspect 13, wherein the converter further comprises a converter carrier adapted to support the plurality of converter plates.

Aspect 17. The system of aspect 16, further comprising a carrier housing, and wherein the converter carrier is removably received by the carrier housing.

Aspect 18. The system of aspect 13, wherein at least three of the plurality of converter plates are positioned in order of ascending thickness in the direction along the axis.

Aspect 19. The system of aspect 18, wherein each of the at least three of the plurality of converter plates has a different thickness.

Aspect 20. A method for producing radioisotopes, the method comprising: directing an electron beam along an axis towards a converter configured to convert the electron beam into photons, the converter comprising: a plurality of converter plates (i) positioned perpendicular to the axis and (ii) arranged sequentially in a direction along the axis from a first converter plate of the plurality of converter plates to a last converter plate of the plurality of converter plates; the first converter plate configured to receive the electron beam traveling in the direction along the axis; and the first converter plate having a thickness smaller than a thickness of the last converter plate, wherein a thickness of a particular converter plate is measured along the axis; positioning, downstream of the converter in the direction along the axis, a target housing supporting a target, such that the target is irradiated by the photons produced by the converter.

Additional Considerations

The following additional considerations apply to the foregoing discussion. Throughout this specification, plural instances may implement functions, components, operations, or structures described as a single instance. Although individual functions and instructions of one or more methods are illustrated and described as separate operations, one or more of the individual operations may be performed concurrently, and nothing requires that the operations be performed in the order illustrated. Structures and functionality presented as separate components in exemplary configurations may be implemented as a combined structure or component. Similarly, structures and functionality presented as a single component may be implemented as separate components. These and other variations, modifications, additions, and improvements fall within the scope of the subject matter herein.

As used herein any reference to "some embodiments" or "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a function, process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description should be read to include one or at least one and the singular also includes the plural unless it is obvious that it is meant otherwise.

Still further, the figures depict preferred embodiments of a system 100 for purposes of illustration only. One of ordinary skill in the art will readily recognize from the following discussion that alternative embodiments of the structures and methods illustrated herein may be employed without departing from the principles described herein.

Upon reading this disclosure, those of skill in the art will appreciate still additional alternative structural and functional designs for methods and systems for producing radioisotopes through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A converter for generating photons from an electron beam, the converter comprising:

a plurality of converter plates (i) positioned perpendicular to an axis and (ii) arranged sequentially in a direction along the axis from a first converter plate of the plurality of converter plates to a last converter plate of the plurality of converter plates;

the first converter plate configured to receive an electron beam traveling in the direction along the axis; and the first converter plate having a thickness smaller than a thickness of the last converter plate, wherein a thickness of a particular converter plate is measured along the axis, wherein one or more of the plurality of converter plates are made of a first material and one or more of the plurality of converter plates are made of a second material that is different from the first material, and wherein each of the plurality of converter plates comprises a material with an atomic number equal to or above 72.

2. The converter of claim 1, wherein at least three of the plurality of converter plates are positioned in order of ascending thickness in the direction along the axis, and wherein spacing between the plurality of converter plates is variable.

3. The converter of claim 2, wherein each of the at least three of the plurality of converter plates has a different thickness.

4. The converter of claim 1, wherein the thickness of the last converter plate is a largest thickness of the plurality of converter plates.

5. The converter of claim 1, wherein:

a thickness of a second converter plate, positioned after the first converter plate and before the last converter plate in the direction along the axis, is smaller than the thickness of the first converter plate.

6. The converter of claim 5, wherein:

at least two of the plurality of converter plates are (i) positioned after the second converter plate along the axis and (ii) positioned in order of ascending thickness in the direction along the axis.

7. The converter of claim 1, further comprising:

a converter carrier adapted to support the plurality of converter plates, the converter carrier adapted to be in slidable communication with a converter housing.

8. The converter of claim 1, wherein adjacent converter plates of the plurality of converter plates are spaced between 0.5 millimeters and 1.5 millimeters apart along the axis.

9. The converter of claim 1, wherein each of the plurality of converter plates has a thickness between 0.1 millimeters and 2 millimeters.

10. The converter of claim 1, wherein a total thickness equal to a sum of thicknesses of the plurality of converter plates is between 1 millimeter and 10 millimeters.

11. The converter of claim 1, wherein the converter is adapted to receive coolant fluid between adjacent converter plates of the plurality of converter plates.

12. A system for producing radioisotopes, the system comprising:

a converter for generating photons from an electron beam, the converter comprising:

a plurality of converter plates (i) positioned perpendicular to an axis and (ii) arranged sequentially in a direction along the axis from a first converter plate of the plurality of converter plates to a last converter plate of the plurality of converter plates;

the first converter plate configured to receive an electron beam traveling in the direction along the axis; and the first converter plate having a thickness smaller than a thickness of the last converter plate, wherein a thickness of a particular converter plate is measured along the axis; and a target housing positioned downstream of the converter, in the direction along the axis, such that photons produced by the converter using the electron beam irradiate the target housing, wherein one or more of the plurality of converter plates are made of a first material and one or more of the plurality of converter plates are made of a second material that is different from the first material, and wherein each of the plurality of converter plates comprises a material with an atomic number equal to or above 72.

13. The system of claim 12, wherein the target housing supports a target that produces the radioisotopes in response to irradiation by the photons.

14. The system of claim 12, wherein:

the target housing comprises a target carrier that supports a target that produces the radioisotopes in response to irradiation by the photons; and the target carrier is removably received by the target housing.

15. The system of claim 12, wherein the converter further comprises a converter carrier adapted to support the plurality of converter plates.

16. The system of claim 15, further comprising a carrier housing, and wherein the converter carrier is removably received by the carrier housing.

17. The system of claim 12, wherein at least three of the plurality of converter plates are positioned in order of ascending thickness in the direction along the axis.

18. The system of claim 17, wherein each of the at least three of the plurality of converter plates has a different thickness.

19. A method for producing radioisotopes, the method comprising:

directing an electron beam along an axis towards a converter configured to convert the electron beam into photons, the converter comprising:

a plurality of converter plates (i) positioned perpendicular to the axis and (ii) arranged sequentially in a direction along the axis from a first converter plate of the plurality of converter plates to a last converter plate of the plurality of converter plates;

the first converter plate configured to receive the electron beam traveling in the direction along the axis; and the first converter plate having a thickness smaller than a thickness of the last converter plate, wherein a thickness of a particular converter plate is measured along the axis; and positioning, downstream of the converter in the direction along the axis, a target housing supporting a target, such that the target is irradiated by the photons produced by the converter, wherein one or more of the plurality of converter plates are made of a first material and one or more of the plurality of converter plates are made of a second material that is different from the first material, and wherein each of the plurality of converter plates comprises a material with an atomic number equal to or above 72.

* * * * *